(No Model.) 3 Sheets—Sheet 3.

A. SHIELS.
VACUUM REGULATING APPARATUS FOR MILKING MACHINES.

No. 513,624. Patented Jan. 30, 1894.

Witnesses:
E. B. Bolton
E. K. Sturtevant

Inventor
Alexander Shiels
By
his Attorneys.

United States Patent Office.

ALEXANDER SHIELS, OF GLASGOW, SCOTLAND.

VACUUM-REGULATING APPARATUS FOR MILKING-MACHINES.

SPECIFICATION forming part of Letters Patent No. 513,624, dated January 30, 1894.

Application filed June 1, 1893. Serial No. 476,243. (No model.) Patented in England May 3, 1892, No. 8,325.

*To all whom it may concern:*

Be it known that I, ALEXANDER SHIELS, M. B., C. M., B. Sc., a subject of the Queen of Great Britain, and a resident of the city of Glasgow, Scotland, have invented certain new and useful Improvements in Vacuum-Regulating Apparatus for Milking-Machines, of which the following is a specification.

The invention has been patented in Great Britain, No. 8,325, dated May 3, 1892.

This invention relates to milking machines, and it has for its object to regulate the vacuum pressure in such machines.

In pulsating machines, that is to say, in machines where the vaccum pressure on the teat cups, is made to rise and fall, say, by way of example, from a maximum of fifteen degrees, to a minimum of five degrees, it is essential that the vacuum should never fall below the minimum, as, if it does so, the teat cups will not cling to the cow's teats with sufficient strength to retain them in position, should the cow jerk or move about. Also it is essential in such machines, to have the pulsations as regular and decided, as possible. The improved regulating apparatus, is designed to keep up a regular and steady pulsation, which shall be effective in all ordinary circumstances, and in which the vacuum is not allowed to fall so low, as to permit the teat cups to readily fall off during the milking. And in order that my said invention may be properly understood, I have hereunto appended three explanatory sheets of drawings, whereon—

Figure 1:
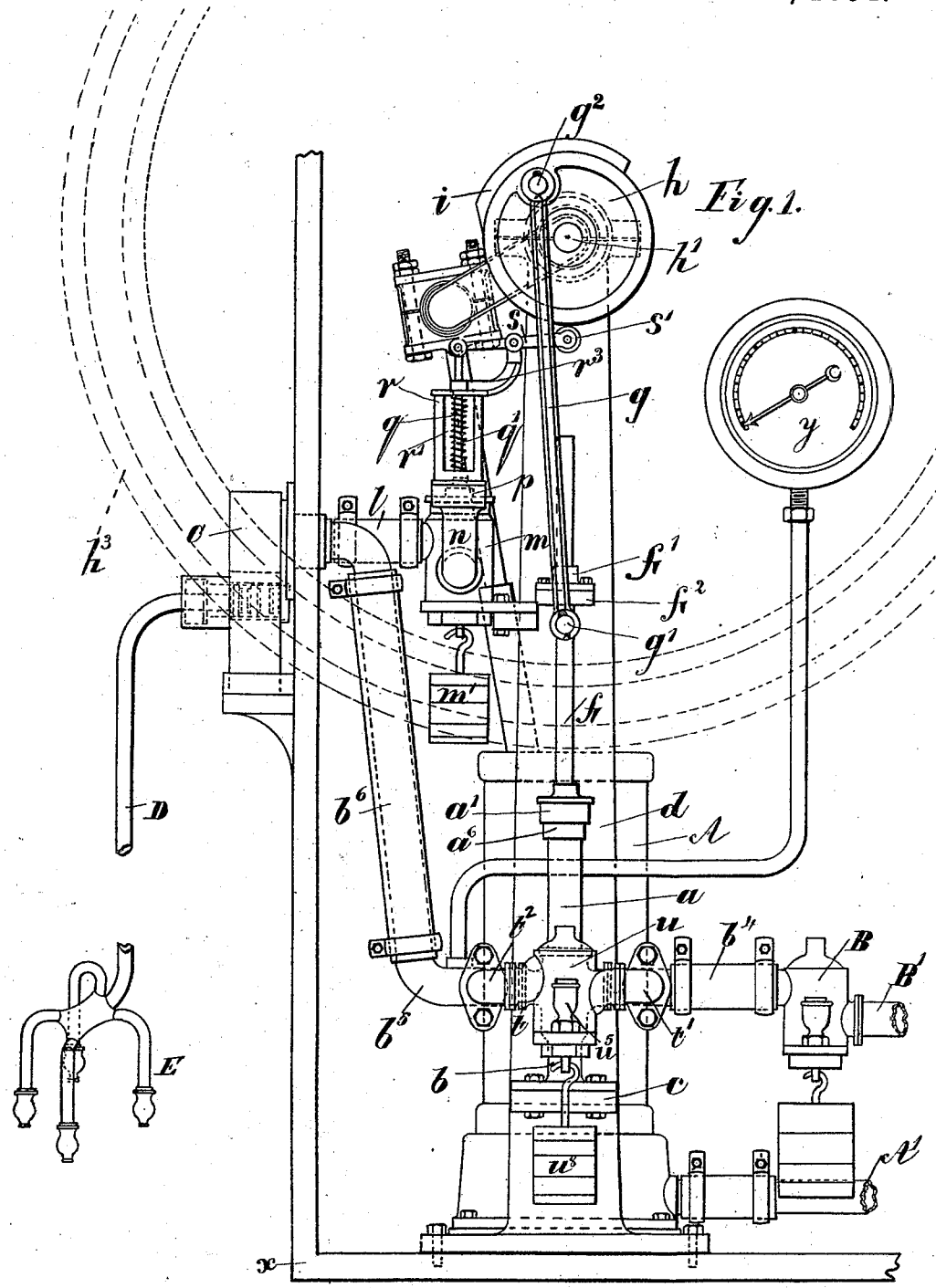
Figure 2:
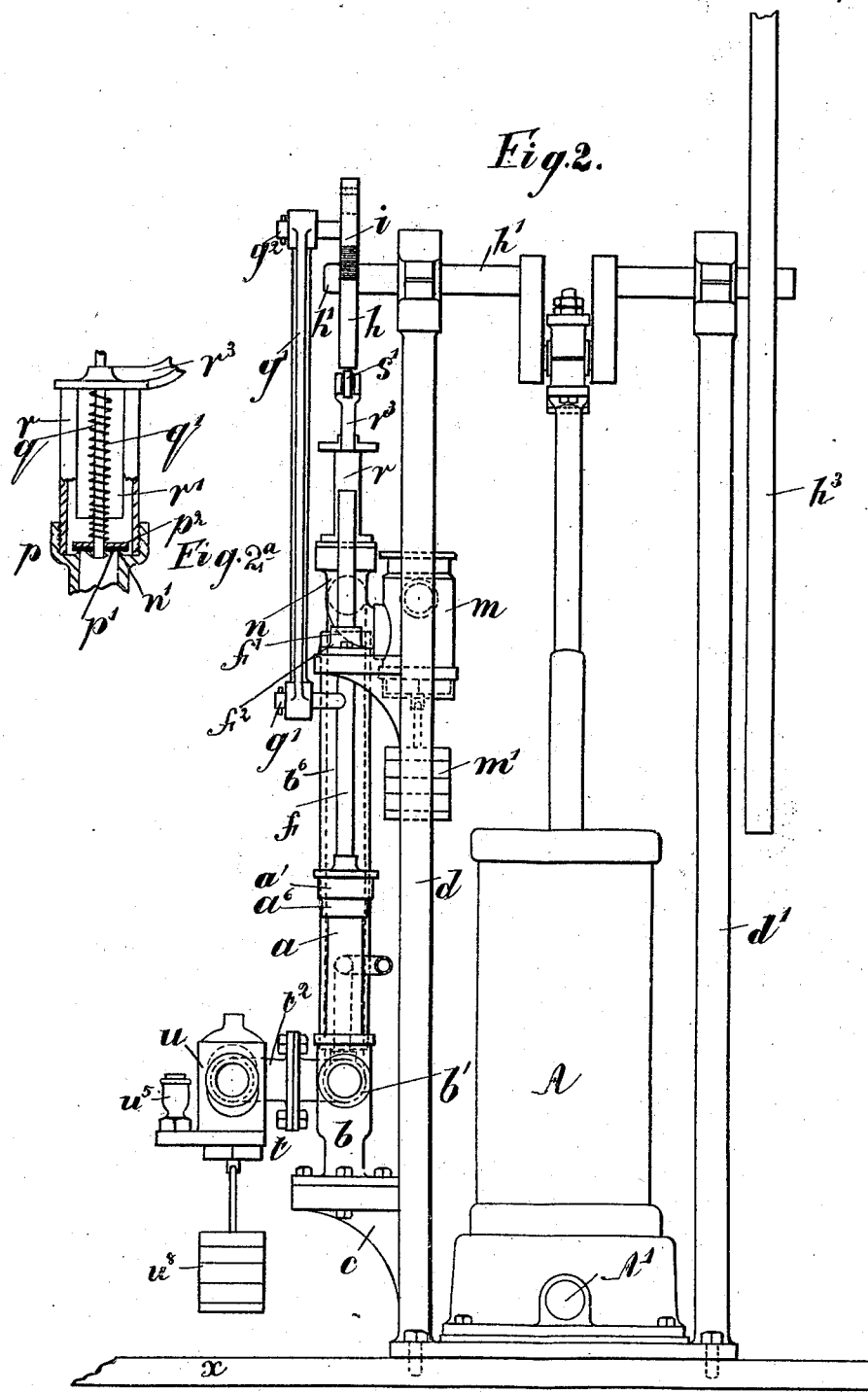
Figure 3:
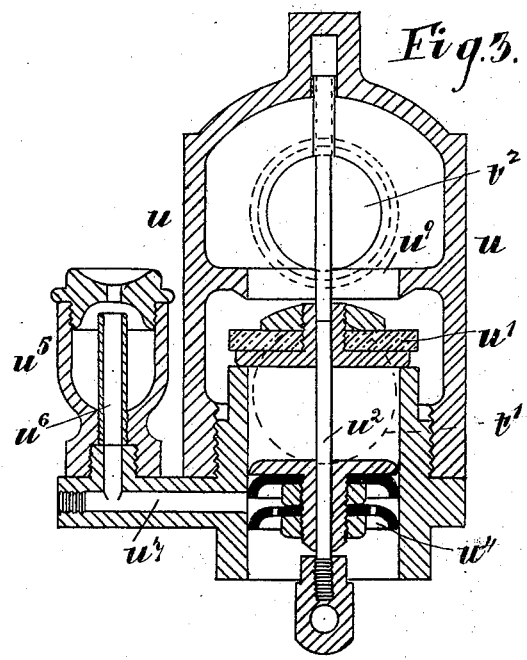
Figure 4:
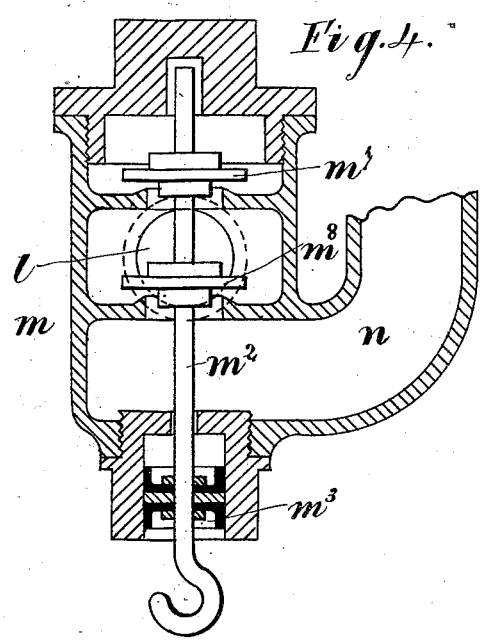
Figure 5:
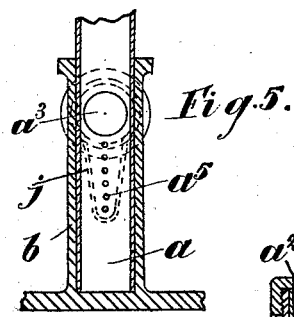
Figure 6:
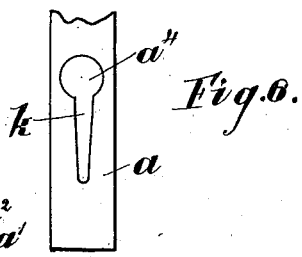
Figure 7:
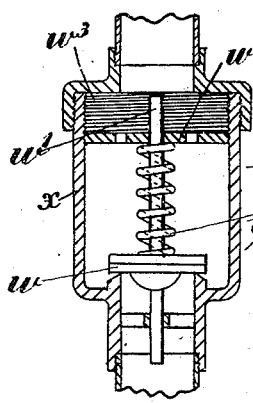
Figure 8:
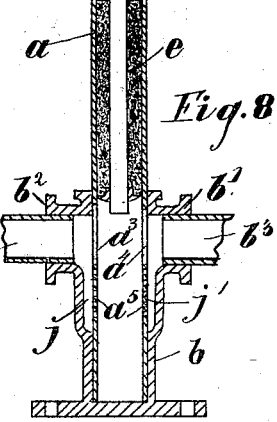

Figure 1 is a side elevation of the apparatus. Fig. 2 is a front elevation of the apparatus. Figs. 3, 4, 5, 6 and 8 are detail views. Fig. 7 is a section of a valve.

Referring to the drawings, the same reference letters, wherever repeated, indicate similar or like parts.

The apparatus consists of a casing or cylinder $a$ (see section Fig. 8) which is fitted within a hollow casting $b$, bolted to a bracket $c$ on the standard or pillar $d$. The pillars $d$, $d'$ carry the shaft $h'$, the crank of which is connected to the piston rod, of the vacuum pump A. The pillars $d$, $d'$ are bolted to a platform $x$ mounted or not, as desired, on wheels. The hollow casting $b$ is made with two branches $b'$, $b^2$. Fitted in the branch $b'$ is a short pipe $b^3$, which has fitted, on its outer end, a hose pipe connection $b^4$, which is connected to the reducing valve B, which again, in its turn, is connected by the pipe B', to the vacuum storage tank or reservoir. (Not shown.) Vacuum is created in this tank by the operations of the pump A, which communicates with the tank by means of the pipe connection A'. Fitted in the branch $b^2$ is a pipe $b^5$, which has fitted, on its outer end, a hose pipe connection $b^6$, leading to the box C. The pipe D, leads from the box C to the teat cups E of the milking machine. Working within the cylinder $a$, is a packed piston $e$, the piston rod $f$ of which passes out through a cap $a'$, screwed on to the top of the cylinder $a$. This cap, which has air holes $a^2$ in it, is, preferably, screwed on to a collar $a^6$, fitted on the tubular cylinder $a$. The piston rod $f$, at its upper end, passes through a guide bearing $f'$, fitted in a bracket $f^2$, cast in one with the vertical standard or pillar $d$. Pinned to a stud $g'$ on the piston rod $f$, is a connecting rod $g$, which, at its upper end, is pinned to a stud $g^2$ on a disk-wheel $h$, carried on the short horizontal shaft $h'$, which is driven by the hand wheel $h^3$ and revolves in bearings, on the top of the pillars $d$, $d'$. The disk-wheel $h$ has a projecting cam piece $i$ on it. The revolutions of the shaft $h'$, and disk or cam-wheel $h$ cause the piston rod $f$ and plunger $e$ to reciprocate up and down within the cylinder $a$.

The cylinder $a$ has two large openings $a^3$, $a^4$, cut in it, one at each side, and these openings communicate, respectively, with the pipes $b^5$ and $b^3$. Below the holes $a^3$, $a^4$, are, at each side of the cylinder, two vertical series of small holes $a^5$. (See also Fig. 5.) The casting $b$ is made, at each side, with narrow tapering passage ways $j$ and $j'$, leading to and allowing free communication through the series of small holes $a^5$. The object of having the large openings $a^3$, $a^4$, and the smaller openings $a^5$, is to allow the vacuum from the pipe $b^3$, to be gradually cut off or supplied, as the case may be, to the pipe $b^5$, and the cups. Instead of having the series of holes $a^5$, the cylinder may be cut, at each side, with a narrow tapering slot, in the manner shown at $k$ Fig. 6.

Leading from the box C is a pipe $l$, which is connected to a vacuum reducing valve $m$, (see Fig. 4) the spindle $m^2$ of which has on it a cup leather piston $m^3$, which is open to atmospheric pressure on its under side. The weights $m'$ are attached to the lower end of the spindle $m^2$. The valve, which is a balanced one and consists of two rubber disks $m^7$, $m^8$ fitted on the spindle $m^2$, is so arranged, that, as long as the vacuum within the pipe $l$ is above the minimum vacuum pressure, the suction on the piston $m^3$ is sufficient to pull up the piston, against the action of the weight, and retain the valve in the open position, as shown, but, immediately the vacuum reaches the minimum, the weight overcomes the reduced vacuum, and shuts the valve. As will be readily understood, by increasing or decreasing the weights $m'$, the minimum vacuum pressure in the teat cups E, and pipe $l$, can be raised or lowered, at will. Leading from the valve $m$ is a pipe $n$, which carries at its upper end, an air admission valve $p$. (See enlarged view Fig. 2ª.) This valve may consist of a rubber or other diaphragm $p'$, having a metal collar $p^2$ as a backing, which bears on the knife-edge seat $n'$. The valve is fitted at the lower end of a spindle $q$, which has coiled round it a spiral spring $q'$.

$r$ is the valve casing and $r'$ openings in the casing. Air has free admission into the valve casing, through the openings $r'$.

$r^3$ is a bracket, cast on the casing $r$, and on this bracket is fulcrumed, at or about its center, the lever $s$, which, at one end, is pinned to the spindle $q$, and, on its other end, carries a roller $s'$, which, by the action of the spring $q'$, is caused to bear against the surface of the cam wheel $h$. The revolutions of the cam wheel $h$, at certain intervals, through the action of the cam surface $i$, presses down the roller $s'$, and, as a consequence, pulls up the spindle $q$, and opens the valve $p$, against the action of spring $q'$.

Jointed to the pipe $b^5$ is a bent pipe connection $t$, which I term the "junction" pipe, and which has fitted on it an automatically acting valve $u$. The pipe $t$ communicates with the pipe $b^5$, at one side of cylinder $a$ and with the pipe $b^3$ at the other. The valve $u$ may be of any suitable construction, but is preferably of the construction shown at Fig. 3. It consists of a rubber disk $u'$ secured to a spindle $u^2$. On the lower end of the spindle is a double cup-leather piston $u^4$ which is open to atmospheric pressure on its under side. This piston is lubricated by oil supplied from the oil cup $u^5$, down the tube $u^6$ and along the passage $u^7$. The lubrication of the cup leather piston reduces friction and keeps the cup-leathers soft.

$u^8$ are weights which are attached to the bottom of the spindle $u^2$. This valve, which acts in an opposite manner to the valve $m$, is so arranged that the suction within the branch $t^2$ of pipe $t$, is sufficient to overcome the weight $u^8$, and keep the valve closed, so long as the vacuum, within said pipe $t^2$, and its connections $b^5$, $b^6$, C, D and E, is at or above the minimum, but, whenever the vacuum is reduced below the minimum, the weight overcomes the suction, opens the valve and supplies vacuum from the pipe $b^3$, by the branch $t'$ to the branch $t^2$, and connections until the vacuum again reaches the minimum, when it automatically closes. According as the minimum vacuum is altered by the altering of the weights $m'$ of the valve $m$, so the weights $u^8$ must be altered to correspond thereto. The valve $u'$ is shown open at Fig. 3 although it is normally held closed when the apparatus is working.

$u^9$ is the valve seat.

The action of the apparatus is as follows:—Presuming that the parts are in the position shown on the drawings, Figs. 1 and 2, and that the maximum vacuum or suction pressure is acting upon the teat cups, and that there is a free passage along the pipes $b^6$, $b^5$, $b^3$, $b^4$, B', to the vacuum storage tank, then, when the shaft $h'$ is turned toward the left, the connecting rod $g$ and the piston rod $f$, is forced downward, thereby forcing down the long packed-piston $e$, toward the bottom of the cylinder $a$, and gradually cutting off the vacuum from the pipe $b^5$ and teat cups E, and reducing the vacuum at said teat cups to the minimum. When the piston is caused to rise again, by the continued revolution of the cam wheel $h$, the vacuum is again gradually supplied until the piston reaches the top of its stroke, when the maximum vacuum is again reached. In this manner, the piston is caused to reciprocate up and down, and cause the vacuum pressure to pulsate, i. e. to gradually rise from the minimum to the maximum pressure, and then gradually fall again. As the vacuum in the pipe connection $b^5$ leading to the teat cups, falls very gradually, it is possible, or may happen, that the vacuum may not fall to the minimum before the piston or plunger $e$ again rises after having completed its downward stroke. To obviate this and to have the pulsations as regular and decided as possible the valves $m$, $p$, are provided. When the piston $e$ has traveled so far, on its downward stroke, as to just overlap the lowest holes $a^5$, the cam $i$ is, at the same time, just bearing on and depressing the roller $s'$, and, as the piston descends, it eventually fully depresses said roller, consequently lifting the valve $p$ off its seat and allowing air to gain access to the interior of the pipe $n$, and reducing valve $m$. Should the vacuum within the pipe $l$ and teat cups not have fallen down to the minimum, before the piston $e$ again rises, then the air passes through the valve $m$ and reduces the vacuum to the minimum limit when, as before explained the valve $m$, automatically closes and cuts off further air ingress so that the minimum vacuum pressure is maintained at the teat cups until the piston $e$ rises sufficiently on its upstroke, to again supply the maximum vacuum to said teat cups. Should the vacuum at the teat cups, at any time, fall below the minimum from any cause, then the valve $u$ comes into action, in the manner hereinbefore explained, and automatically supplies directly and independently of the action of the piston $e$ sufficient vacuum from the pipe $b^4$ and storage tank to make up the deficiency.

As will be seen with this apparatus regular and decided vacuum pulsations are always insured.

Instead of using the reducing valves $m$ and $u$, the valves such as that at $x$ Fig. 7 may be employed. This valve consists, preferably, of a rubber diaphragm $w$ fitted on a spindle $w'$, which works through a perforated guide plate $w^2$. This guide plate, which is screwed on its periphery, works in the internal screw-thread $w^3$ cut in the valve casing and can be adjusted by being screwed up or down so as to regulate the tension of the spring $w^4$, which, at one end, bears against the back of the valve, and, at the other end, against the plate $w^2$. If the valve $x$ is used in lieu of the valve $m$ the action is precisely the same as said valve except that the diaphragm $w$ is closed on its seat so long as the air admission valve $p$ is closed, but the diaphragm valve $w$ opens, whenever the air admission valve $p$ is opened so as to reduce the vacuum in the pipe $l$ to the minimum, and, when this has been done, the action of the spring $w^4$ closes the valve automatically. The spring $w^4$, in this case, acts in the same manner as the weight $m'$, (Fig. 1,) and is of such power as to prevent the valve opening when the vacuum at $l$ is at or below the minimum.

Having now fully described my invention, what I claim, and desire to secure by Letters Patent, is—

1. In a pulsating milking machine, the suction or vacuum pipe, the means for varying the vacuum pressure therein and an automatic valve in communication with the vacuum pipe for reducing at certain times the vacuum pressure at the teat cups, substantially as described.

2. In a pulsating milking machine the suction or vacuum pipe, the means for varying the vacuum pressure therein, and an automatic valve for supplying vacuum pressure to the teat cups whenever the vacuum at the teat cups falls below the minimum.

3. In pulsating milking machines the combination of the suction or vacuum pipe having teat cups, the means for varying the pressure in said pipe to produce the pulsations, an automatic valve communicating with said pipe for reducing the vacuum at the teat cups to the minimum at certain times, and a second automatic valve for supplying vacuum to said teat cups when the vacuum falls below the minimum, substantially as described.

4. In combination in a pulsating milking machine, the suction or vacuum pipe, the movable part $e$ with means for reciprocating the same to vary the vacuum pressure in the vacuum pipe, the vacuum reducing valve $m$ in communication with the vacuum pipe for reducing the vacuum therein at certain times and the means for operating said valve synchronously with the reciprocation of the movable part $e$, substantially as described.

5. In combination, in a pulsating milking machine, the teat cups, the pipe connected therewith through which the suction is produced by the exhaust apparatus, and the means for varying the suction pressure to secure the pulsating action consisting of the cylinder, $a$, connected with the suction pipe and having ports leading to said pipe and the piston with means for reciprocating the same in the cylinder to vary the size of the ports, substantially as described.

6. In combination in a pulsating milking machine, the suction pipe, the cylinder $a$ connected therewith and having the large ports $a^3$ $a^4$ and the reduced ports and the piston $e$ with means for reciprocating the same over the large and small ports, substantially as described.

7. In combination in a pulsating milking machine the suction pipe the cylinder $a$ having the large and small openings, the piston with means for operating it in the cylinder and the casting $b$ supporting the cylinder and having the tapered passage ways $j$ $j'$, substantially as described.

8. The combination with the pulsating cylinder $d$, of branch pipes $b^3$, $b^5$, and junction pipe $t$ having a vacuum supply valve $u$ fitted thereon, substantially as hereinbefore set forth.

9. The combination with the pipe ($l$) communicating with the teat cups, of a reducing valve $m$ fitted in connection therewith and an air admission valve $p$ fitted in connection with said reducing valve and operated synchronously with the reciprocations of the pulsating piston of the machine, substantially as set forth.

10. In combination the suction pipe, the vacuum reducing valve $m$ in communication therewith, the pipe connection $n$, the air valve fitted therein, the spring for holding said valve normally closed and the lever $s$, and cam wheel for lifting the valve at certain times substantially as described.

In witness whereof I have hereunto signed my name, at Glasgow, Scotland, this 28th day of February, 1893.

ALEXANDER SHIELS.

Witnesses:
H. D. FITZPATRICK,
WILLIAM FLEMING.